US012766676B2

(12) United States Patent
Gottschling et al.

(10) Patent No.: US 12,766,676 B2
(45) Date of Patent: Oct. 20, 2026

(54) SHEAR WRENCH TOOL

(71) Applicant: BLACK & DECKER INC., New Britain, CT (US)

(72) Inventors: Rafael Gottschling, Idstein (DE); Michael Kunz, Idstein (DE); Philipp Libera, Taunusstein (DE); Benjamin Schmidt, Idstein (DE)

(73) Assignee: BLACK & DECKER INC., New Britain, CT (US)

( * ) Notice: Subject to any disclaimer, the term of this patent is extended or adjusted under 35 U.S.C. 154(b) by 657 days.

(21) Appl. No.: 18/298,752

(22) Filed: Apr. 11, 2023

(65) Prior Publication Data

US 2024/0082992 A1 Mar. 14, 2024

(30) Foreign Application Priority Data

Sep. 13, 2022 (GB) ...................................... 2213341

(51) Int. Cl.

*B25B 21/00* (2006.01)
*B25B 23/00* (2006.01)
*B25B 23/147* (2006.01)

(52) U.S. Cl.

CPC ........ *B25B 21/002* (2013.01); *B25B 23/0057* (2013.01); *B25B 23/147* (2013.01)

(58) Field of Classification Search

CPC ... B25B 21/00; B25B 21/002; B25B 23/0057; B25B 23/147; B25B 23/1415
USPC ...................................... 81/55, 56, 473, 475
See application file for complete search history.

(56) References Cited

U.S. PATENT DOCUMENTS

| | | | | |
|---|---|---|---|---|
| 4,403,529 A * | 9/1983 | Ikeda | B25B 23/1415 81/56 |
| 4,550,633 A * | 11/1985 | Fujita | B25B 21/001 81/56 |
| 5,816,121 A * | 10/1998 | Yoshimizu | B25B 23/1415 173/217 |
| 2012/0014065 A1* | 1/2012 | Haga | H02K 7/145 361/717 |

FOREIGN PATENT DOCUMENTS

| | | |
|---|---|---|
| EP | 3831532 B1 | 7/2023 |
| GB | 2230218 A | 10/1990 |
| JP | H1015847 A | 1/1998 |

OTHER PUBLICATIONS

GB Search Report dated Mar. 6, 2023 cited in corresponding GB Patent Application No. GB2213341.7.
Extended EP Search Report Dated Jan. 26, 2024, cited in corresponding EP Patent Application No. 23166650.4.

* cited by examiner

*Primary Examiner* — Edward F Landrum
(74) *Attorney, Agent, or Firm* — Kofi A. Schulterbrandt

(57) ABSTRACT

A shear wrench tool including a motor; a transmission operatively connected to the motor; a first socket arranged to engage a tip of a bolt to be sheared; a second socket arranged to engage a nut threaded on the bolt; wherein the first socket and second sockets are operatively connected to the transmission and rotate in opposite directions relative to each other when the motor provides torque to the transmission in use; an ejector mechanism comprising an ejector pin coaxial with the first and second sockets and moveable between a retracted position for enabling the tip of a bolt to be sheared to be received in the first socket and an extended position for urging a sheared tip from within in the first socket.

15 Claims, 6 Drawing Sheets

SHEAR WRENCH TOOL

CROSS-REFERENCE TO RELATED APPLICATIONS

This application claims priority from GB Patent Application No. 2213341.7, filed Sep. 13, 2022, the disclosures of which is incorporated herein by reference in its entirety.

FIELD OF THE INVENTION

This disclosure relates to a shear wrench tool having sheared tip ejection functionality.

BACKGROUND OF THE INVENTION

In some worksites tension control bolts are used to fasten two workpieces together, for example, steel joints in heavy construction. During a fastening operation first and second sleeves of a shear wrench tool rotatably drive a nut and a tension control bolt in opposite directions for securing work pieces together, wherein the first output sleeve drives the nut and the second output sleeve drives a tip of the tension control bolt which shears from the tension control bolt when a predetermined fastening torque is exceeded. Subsequently the tip must be removed from the second output sleeve before the shear wrench tool performs another fastening operation. Including an ejection mechanism in a such a tool takes up space, meaning it is desirable for an ejection mechanism to be compact while still achieving the required function.

BRIEF SUMMARY OF THE INVENTION

According to an aspect of the present invention there is provided a shear wrench tool according to claim 1. Optional features are defined by dependent claims 2 to 14.

BRIEF DESCRIPTION OF THE DRAWINGS

Various aspects and examples of the invention will now be described by way of non-limiting example with reference to the accompanying drawings, in which.

DETAILED DESCRIPTION OF THE PREFERRED EMBODIMENT

Figure 1:
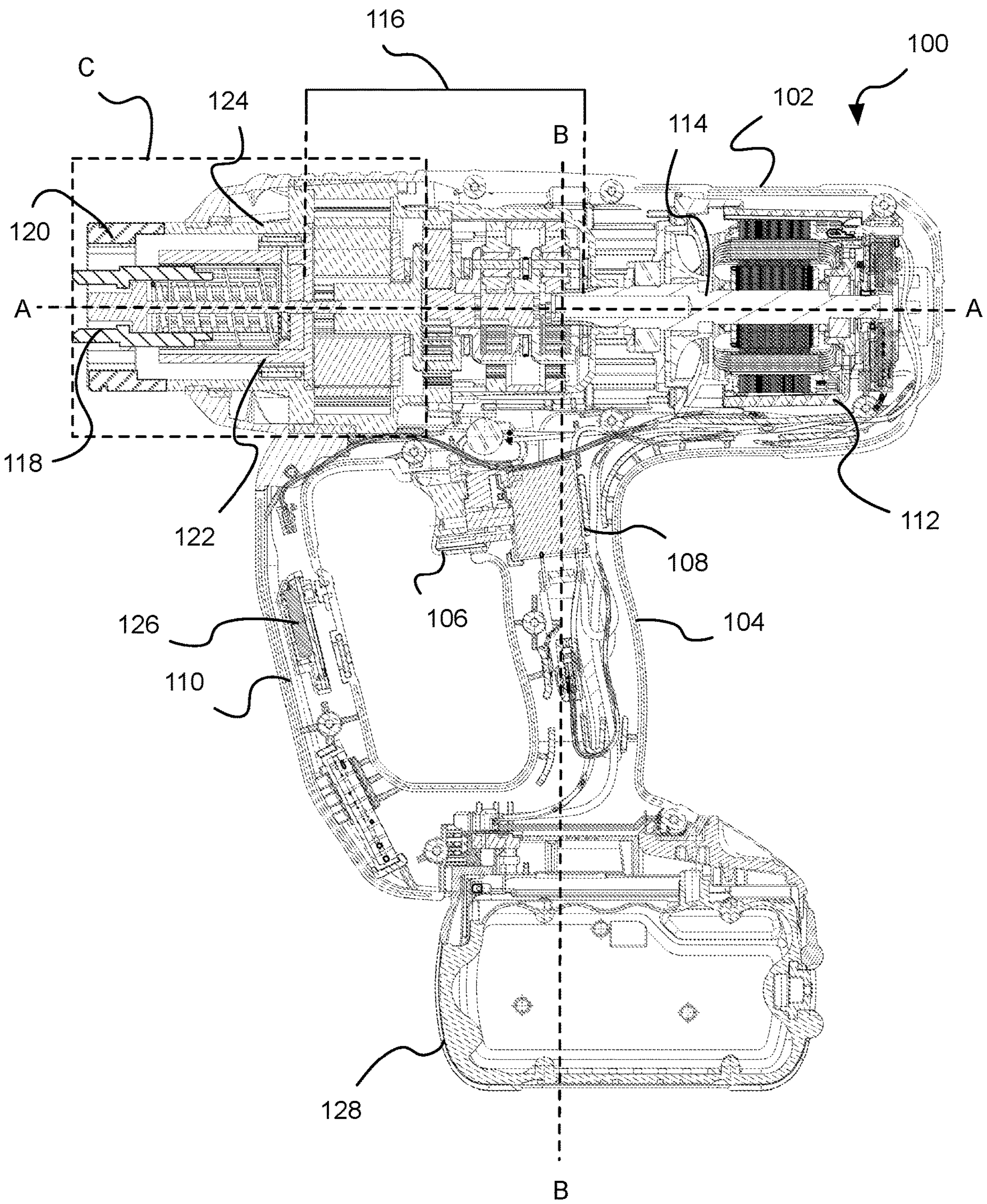
FIG. 1 shows a cross-sectional side view of a shear wrench tool.

FIG. 1 shows a side cross-sectional view of a shear wrench tool 100. The shear wrench tool 100 is a power tool suitable for tightening a tension control bolt 200 and cooperating nut 202 as shown in FIG. 2.

Figure 2:
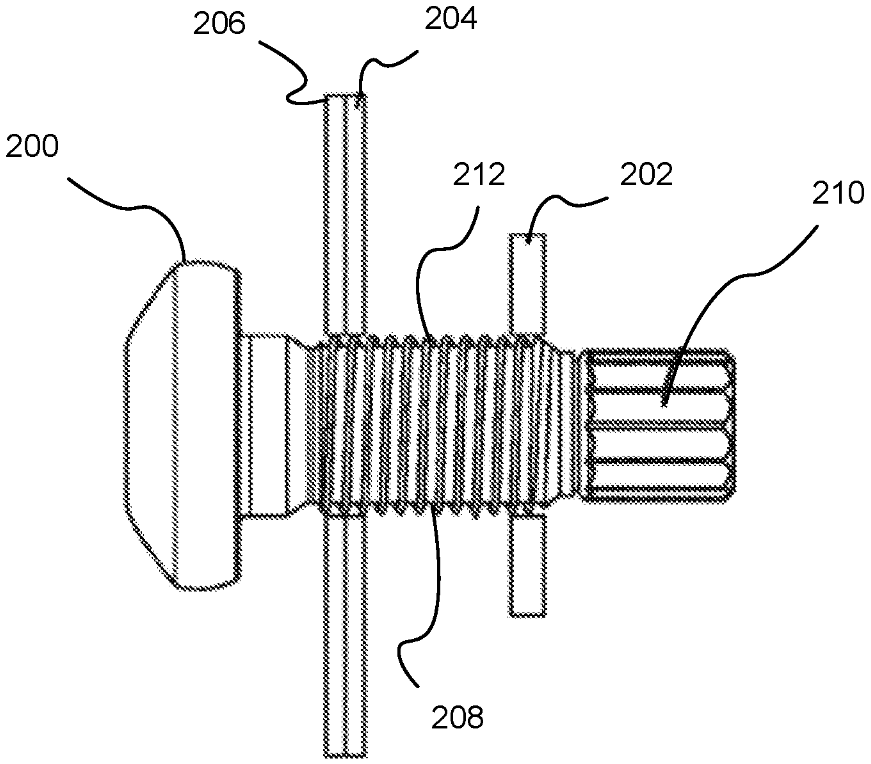
FIG. 2 shows a side view of a bolt and a nut for use with the shear wrench tool.

FIG. 2 shows a side view of the bolt 200 and nut 202 for use with the shear wrench tool 100. The bolt 200 and nut 202 in FIG. 2 are used to fasten a first workpiece 204 and a second workpiece 206 at a predetermined torque. The bolt 200 comprises bolt body portion 208 and a shearable tip 210. The nut 202 is threaded on a threaded shaft 212 of the bolt body portion 208. The tip 210 shears from the bolt body portion 208 when the shear wrench tool 100 exerts a predetermined torque when tightening the nut 202 on the bolt 200. The dimensions of the bolt 200 can be varied to adjust the torque at which the tip 210 shears from the bolt body portion 208. The shear wrench tool 100 tightens the nut 202 on the bolt 200 by simultaneously exerting a torque in opposite directions on the bolt 200 and the nut 202. The operation of the shear wrench tool 100 will be discussed in more detail below.

The shear wrench tool comprises a housing 102 which has a clam-shell type construction. The housing 102 extends along a first longitudinal axis A-A. The housing 102 comprises a primary handle 104 for the user to grip during use. The primary handle 104 extends in a direction substantially perpendicular to the first longitudinal axis A-A along a second longitudinal axis B-B. A trigger 106 is located in the primary handle and is arranged to actuate a trigger switch 108 when the user squeezes the trigger 106. The housing 102 comprises a secondary handle 110 for the user to also grip during use.

A DC brushless motor 112 is mounted in the housing 102 and is electrically connected to a removeable battery pack 128. The battery pack 128 is connected to the housing 102 on the primary handle 104. The battery pack 128 is mechanically mounted via an electrical and mechanical connection. Battery packs 128 are known and will not be discussed in any further detail.

A controller 126 is mounted in the housing 102 and the controller 126 is electrically connected to the motor 112 and the battery pack 128. The controller 126 is configured to issue control signals to the motor 112 to control the speed and direction of the motor 112. In particular the controller 126 interacts with control circuitry of the motor 112 for controlling operation of the motor 112. The controller 126 is mounted on a printed circuit board and fastened to the housing 102. The position of the controller 126 within the housing of the tool 100 can be different to that shown in the drawings, as will be apparent to persons skilled in the art.

The motor 112 comprises an output drive shaft 114. The output drive shaft 114 is operatively connected to a transmission 116. The transmission 116 in turn is operatively connected to a first socket 118 and a second socket 120. In this way, the transmission 116 transmits a torque provided by the motor 112 to the first and second sockets 118, 120.

The first socket 118 is engageable with the tip 210 of the bolt 200 and rotates in a first direction when the motor 112 is operated in use. The second socket 120 is engageable with the nut 202 and rotates in an opposite direction to the first socket 118 when the motor 112 is operated in use. When the tip 210 of the bolt 200 has been sheared from the bolt body portion 208, the tip 210 is remains in the first socket 118 until it is removed such as by being ejected from the first socket 118 by an ejection mechanism of the tool 100.

The transmission 116 comprises a plurality of operatively coupled planetary and sun gears in order to generate a high torque at the first and second sockets 118, 120. The configuration of a transmission 116 suitable for transferring torque between the motor 112 and the first and second sockets 118, 120 will be apparent to a person skilled in the art; for example, a suitable transmission is the transmission 24 described in EP 3 831 532 A1 which is incorporated herein by reference and will not be described in any further detail. The transmission 116 can comprise any suitable gearing between the output drive shaft 114 of the motor and the first and second sockets 118, 120 to transmit torque therebetween.

The first transmission output sleeve 122 is connected to the first socket 118 by a mechanism which secures such features rotatably but allows some translational movement relative to each other due to a spline-fit arrangement between such features. Protrusions extending from the first transmission output sleeve 122 are received in channels of the first socket 118 (or vice versa) for enabling this. A spring 304 urges the first socket 118 translationally away from the electric motor 112 wherein ends of the aforementioned channels of the first socket 118 prevent the first socket 118 from being ejected from the tool 100.

The second transmission output sleeve 124 is connected to the second socket 120 by a mechanism which secures such features rotatably and axially relative to each other. As mentioned above the output of the transmission 116 is such that the first socket 118 and the second socket 120 rotate in opposite directions during use of the tool 100.

During a fastening operation of the shear wrench tool 100, the motor 112 rotates in the first direction until the tip 210 is sheared from the bolt body portion 208. Once the tip 210 has been sheared, the bolt 200 and nut 202 are tightened to the correct torque. The user can then remove the shear wrench tool 100 from the bolt 200 and the nut 202.

Figure 3:
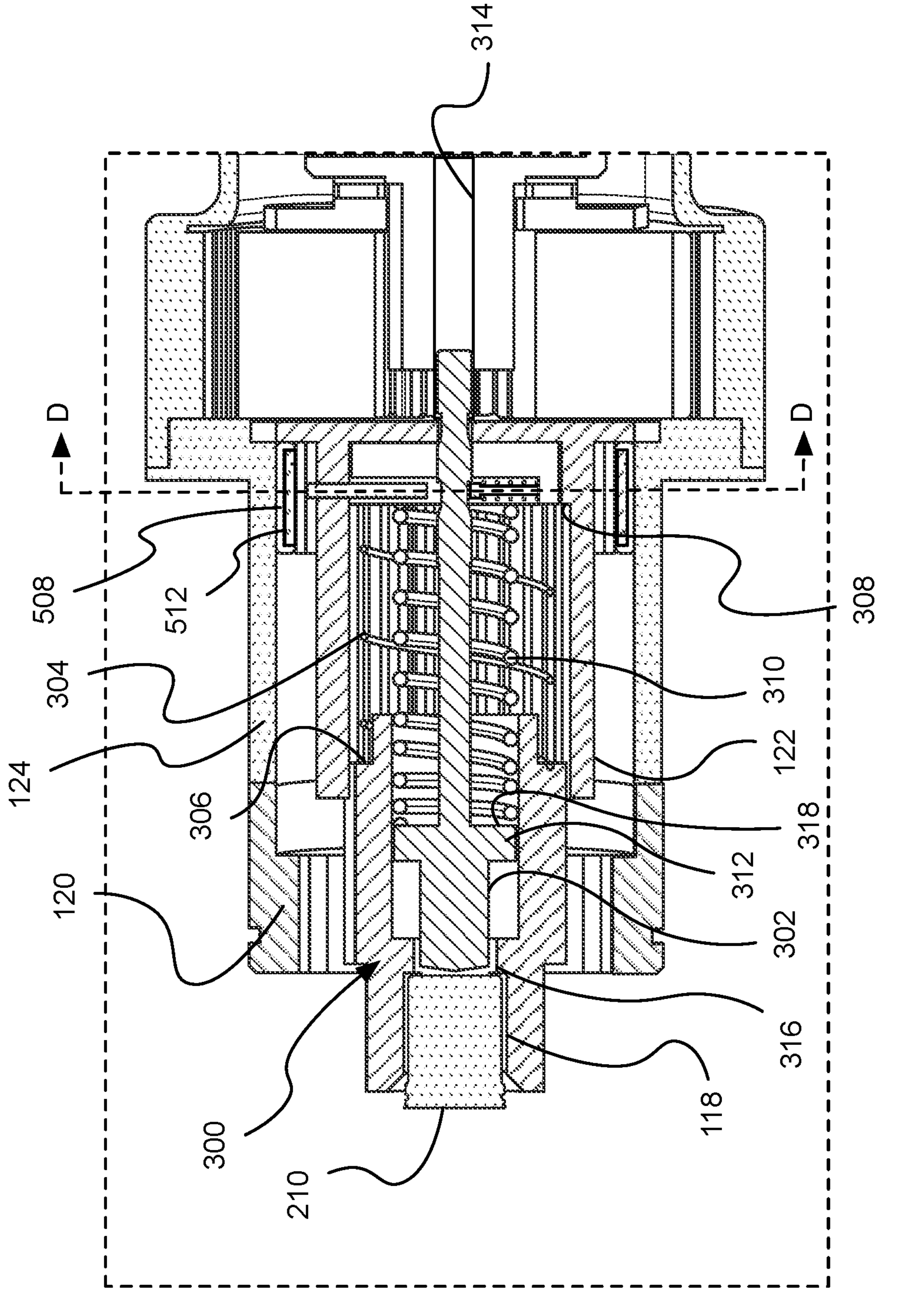
FIGS. 3 and 4 show a close-up cross-sectional side view of an ejector mechanism in different operational states.

After the tip 210 has been sheared, the tip 210 often remains in the first socket 118 as shown in FIG. 3. In order to remove the tip 210, the shear wrench tool 100 comprises an ejector mechanism 300 for ejecting the sheared tip 210 from the first socket 118.

Figure 4:
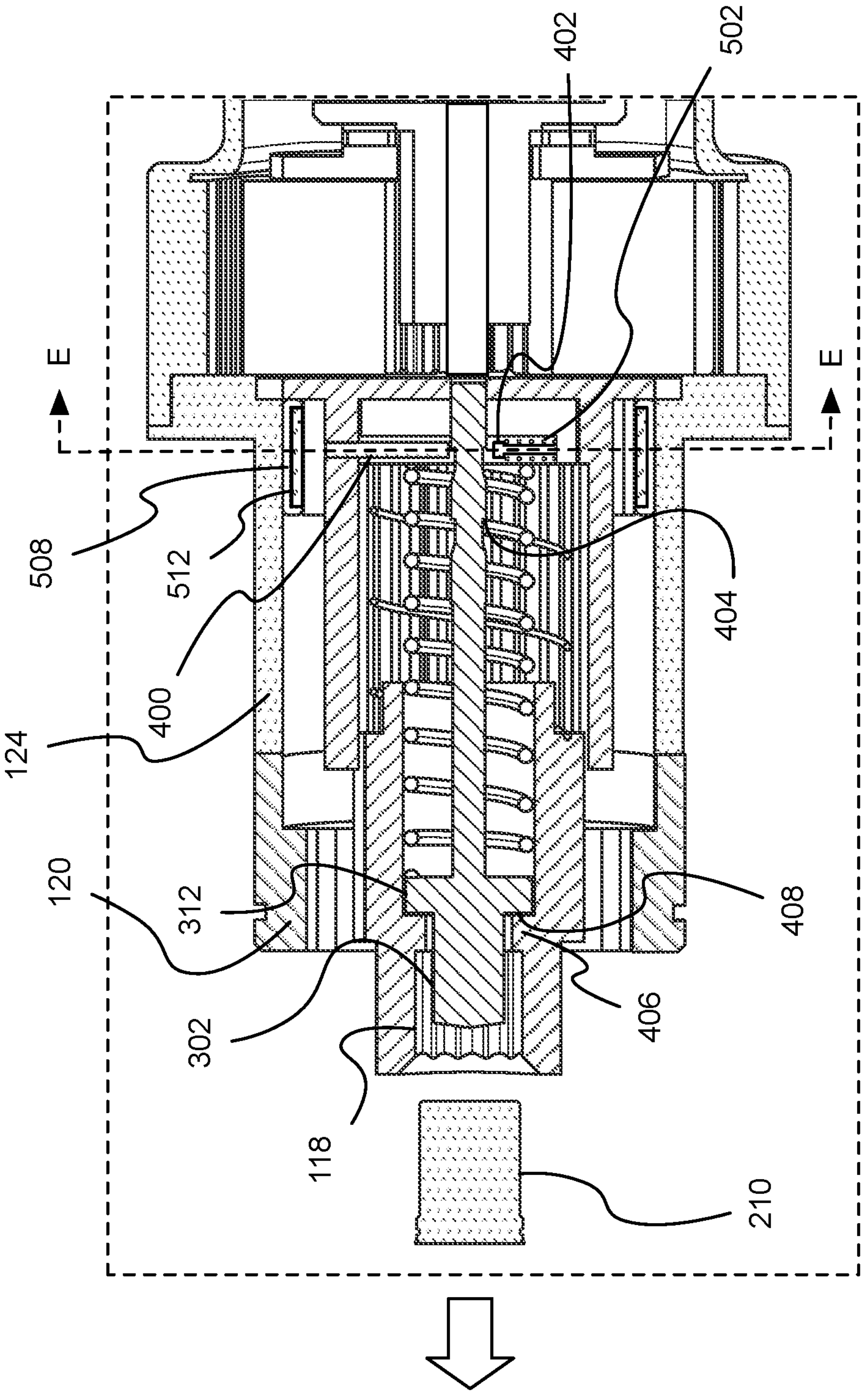

The ejector mechanism 300 will be discussed in more detail with reference to FIGS. 3 and 4. FIGS. 3 and 4 show a close-up cross-sectional side view of the shear wrench tool 100 in the area outlined by dotted box C in FIG. 1. The cross-sectional side views in FIG. 3 and FIG. 4 do not show the housing 102.

The first socket 118 is moveable axially along the longitudinal axis A-A with respect to the first transmission output sleeve 122. When the user presses the first socket 118 against the tip 210 of the bolt 200, the first socket 118 moves into the first transmission output sleeve 122. This means the shear wrench tool 100 engages both the nut 202 and the tip 210 of the bolt 200 and is in a configuration ready to fasten the bolt 200 and nut 202. When the user removes the shear wrench tool 100 from the bolt 200 and no longer presses the first socket 118 against the bolt 200, the first socket 118 is urged by a first socket spring 304 out of the first transmission output sleeve 122 as shown in FIG. 3. The first socket spring 304 urges against a first socket shoulder portion 306 and a first transmission output sleeve shoulder portion 308.

The ejector mechanism 300 comprises an ejector pin 302 moveable between a retracted position and an extended position. In the extended position, the ejector pin 302 protrudes into the first socket 118 via socket hole 316. In this way, the ejector pin 302 is configured to push the sheared tip 210 out of the first socket 118 when in the extended position. The ejector pin 302 as shown in FIG. 3 is in the retracted position and in the extended position as shown in FIG. 4. In FIG. 4 the sheared tip 210 has been pushed out of the first socket 118 by the ejector pin 302 in the direction indicated by the arrow.

When the shear wrench tool 100 is fastening a bolt 200 and nut 202, the ejector pin 302 is in the retracted position so that the ejector mechanism 300 does not interfere with the fastening operation of the bolt 200 and nut 202.

The ejector pin 302 is moveable along the longitudinal axis A-A between the retracted position and the extended position. The ejector pin 302 is coaxial with the first socket 118, the second socket 120, the transmission 116 and the output drive shaft 114 of the motor 112. The ejector pin 302 is urged towards the extended position by an ejector pin spring 310. The ejector pin 302 comprises a projecting flange 312 and the ejector pin spring 310 urges against a first flange surface 318 facing the first transmission output sleeve 122.

Movement of the ejector pin 302 between the retracted position and the extended position is restricted by a retaining arm 400. The retaining arm 400 is moveable between a retaining position and a release position. In the retaining position, the retaining arm 400 engages the ejector pin 302 and retains the ejector pin 302 in the retracted position. In the release position, the retaining arm 400 does not engage the ejector pin 302 and the ejector pin 302 is freely moveable between the retracted position and the extended position.

The retaining arm 400 is moveable in a radial direction with respect to the ejector pin 302. Since the retaining arm 400 moves in a radial direction, the ejector mechanism 300 is compact. Furthermore, actuation of the ejector mechanism 300 can be achieved by reversing the direction of the motor 112. The engagement of the ejector mechanism 300 will be described in more detail below.

When the ejector mechanism 300 is not engaged and in the retracted position, a pin engagement surface 402 of the retaining arm 400 engages a retaining shoulder 404 on the ejector pin 302. The pin engagement surface 402 blocks the path of the ejector pin 302 moving forward into the extended position from the retracted position.

Figure 5A:
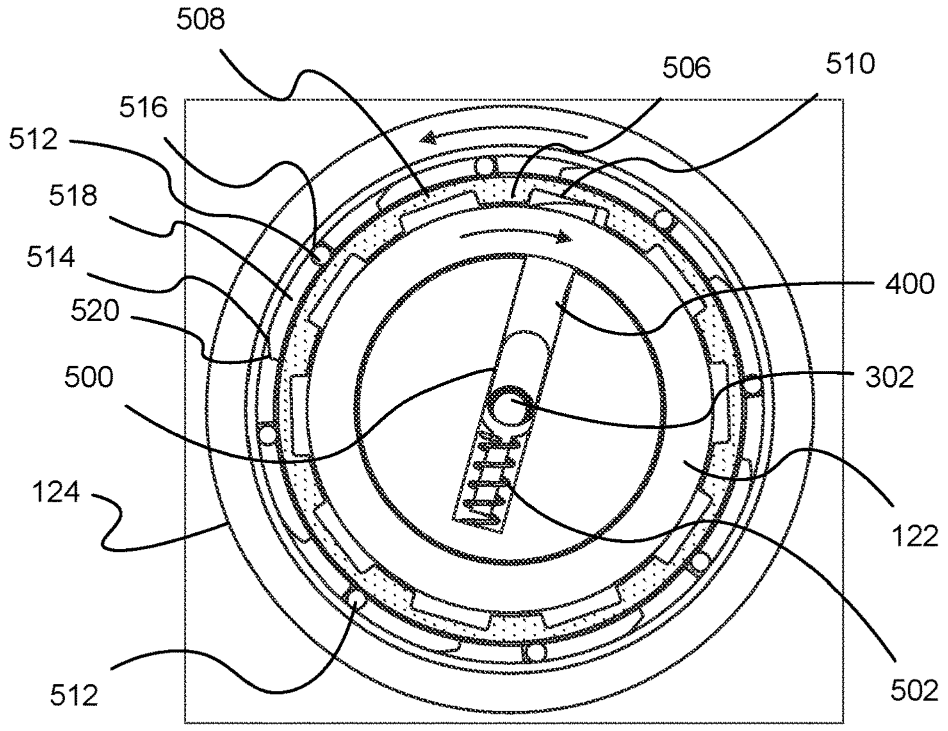
FIGS. 5*a* and 5*b* show cross-sectional views of the ejector mechanism in different operational states.
Figure 5B:
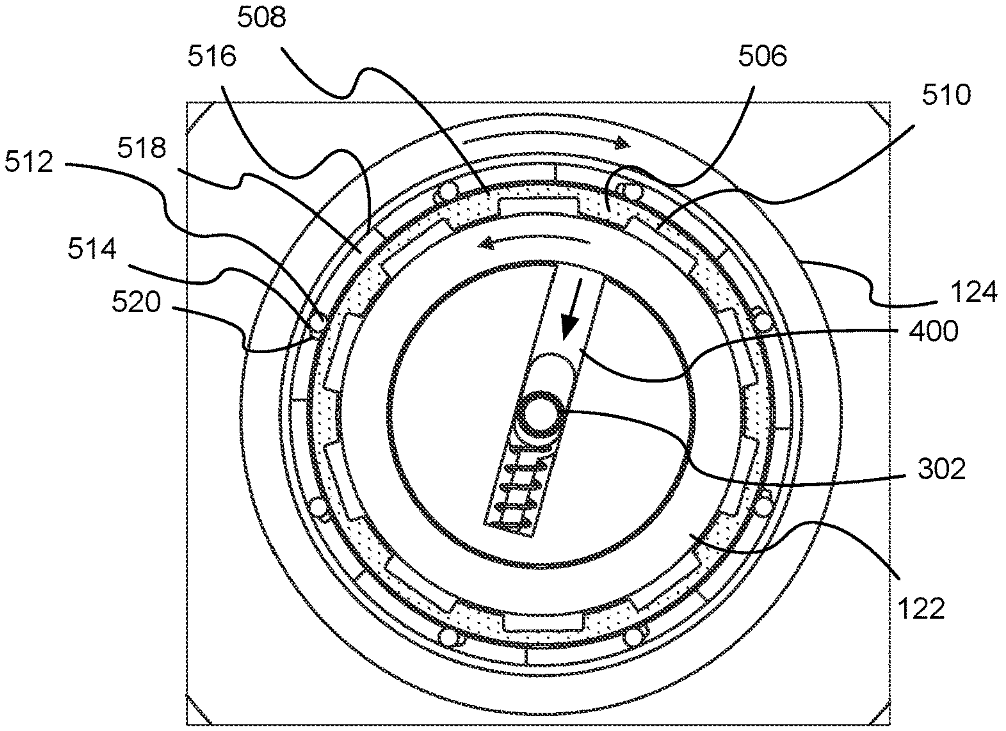
Figure 6A:
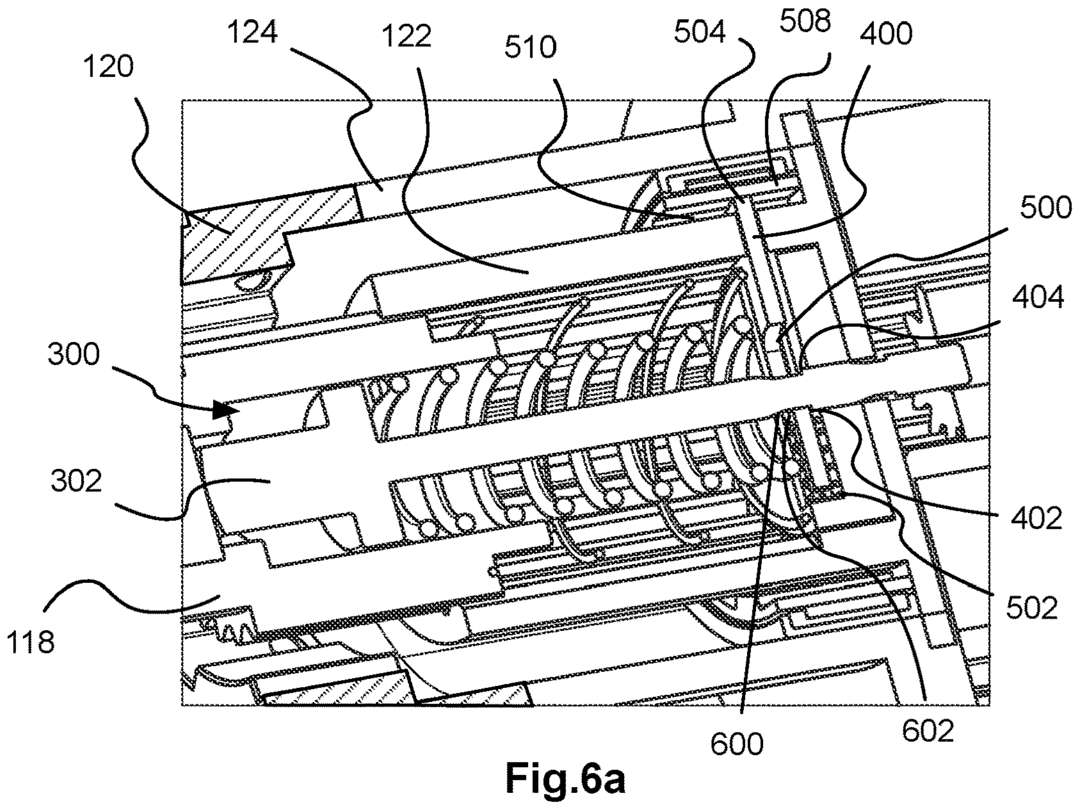
FIGS. 6*a* and 6*b* show perspective cut-away views of the ejector mechanism in different operational states.
Figure 6B:
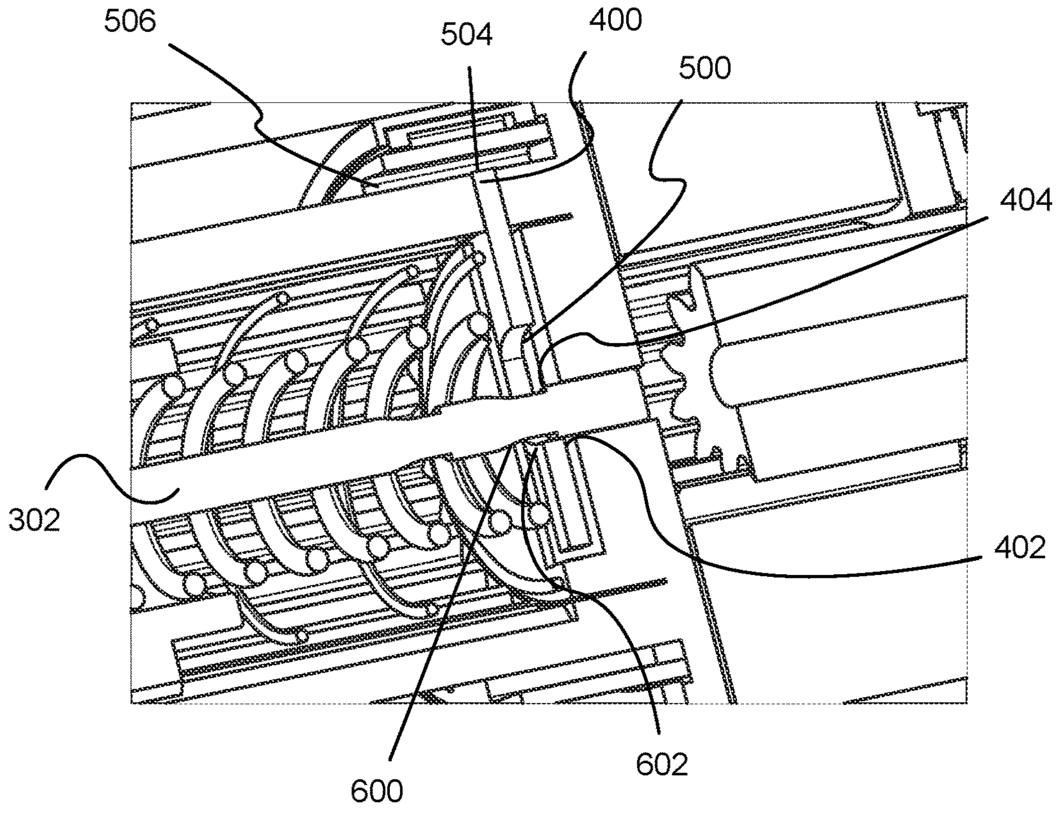

FIG. 5*a* shows the retaining arm 400 partially blocking the path of the ejector pin 302 since the pin engagement surface 402 of the retaining arm 400 engages the retaining shoulder 404. FIG. 5*a* is a cross-sectional view of the ejector mechanism along the axis D-D in FIG. 3. Likewise, FIG. 5*b* is a cross-sectional view of the ejector mechanism along the axis E-E in FIG. 4. In FIGS. 3 and 5*a* the ejector pin 302 is in the retracted position and the retaining arm 400 is in the retaining position. In FIGS. 4 and 5*b* the ejector pin 302 is in the extended position and the retaining arm 400 is in the release position. Movement of the retaining arm 400 between the retaining position and the release position is further shown in FIGS. 6*a*, 6*b* which show perspective cut-away views of the ejector mechanism 300.

The retaining arm 400 comprises an elongate through hole 500 and the pin engagement surface 402 of the retaining arm 400 is a lip 602 of the through hole 500. The ejector pin 302 projects through the through hole 500.

The retaining arm 400 is urged towards the retaining position by a retaining arm spring 502. This means that the retaining arm 400 will be pushed radially outwards to the retaining position by the retaining arm spring 502. When the user pushes the first socket 118 into the first transmission output sleeve 122, the first socket 118 pushes the ejector pin 302 from the extended position to the retracted position.

The first socket 118 comprises an internal rib 406 which engages a second flange face 408 of the projecting flange 312 of the ejector pin 302 when the first socket 118 moves into the first transmission output sleeve 122. The retaining arm 400 snaps into engagement with the retaining shoulder 404 on the ejector pin 302 when the ejector pin 302 is in the retracted position as shown in FIG. 3. This causes the ejector mechanism 300 to be retained in the retracted position and prevented from engaging the tip 210 in the first socket 118.

The ejector pin 302 is also permitted to move further into the shear wrench tool 100 when the first socket 118 is fully inserted into the first transmission output sleeve 122. When the ejector pin 302 is pushed into the shear wrench tool 100 beyond the retracted position, the ejector pin 302 is received in a central hole 314 of the transmission 116. The extent of the travel of the ejector pin 302 into the central hole 314 is dependent on how much the user pushes the first socket 118 against the bolt 200. The retaining arm 400 engages the ejector pin 302 as described above when the shear wrench tool 100 is removed from the bolt 200 and the ejector pin 302 is urged out of the central hole 314 towards the retracted position.

The retaining arm 400 comprises a camming surface 504 (see FIG. 6*a*) at a distal end of the retaining arm 400 remote from the elongate through hole 500. The camming surface 504 is received in a retaining arm channel 510 as shown in FIG. 5*a*. The camming surface 504 is engageable with an engagement rib 506 of a rotatable release sleeve 508.

The rotatable release sleeve 508 comprises a plurality of retaining arm channels 510 the engagement ribs 506 circumferentially spaced around an inside surface of the rotatable release sleeve 508 facing the first transmission output sleeve 122. The plurality of retaining arm channels 510 and the engagement ribs 506 extend along the inside surface of the rotatable release sleeve 508 in a direction parallel with the longitudinal axis A-A.

The rotatable release sleeve 508 is mounted between the first transmission output sleeve 122 and the second transmission output sleeve 124 with a plurality of needle bearings 512. The needle bearings 512 are each mounted within a respective bearing channel 518. The bearing channels 518 are circumferentially spaced around an outside surface of the rotatable release sleeve 508 facing the second transmission output sleeve 124. The needle bearings 512 are slidable within their respective bearing channel 518 between a wide channel end 516 and a narrow channel end 514.

The needle bearings 512 extend along axes which are parallel to the longitudinal axis A-A. Accordingly, the rotatable release sleeve 508 is aligned coaxially along the longitudinal axis A-A and rotatable about the longitudinal axis A-A. For the purposes of clarity, only one needle bearing 512 and one respective bearing channel 518 has been labelled in FIG. 5*a*.

The rotatable release sleeve 508 is stationary with respect to the retaining arm 400 when the motor 112 rotates in the first direction. The first transmission output sleeve 122 and the second transmission output sleeve 124 rotate in opposite directions relative to each other when the motor 112 rotates in the first direction as shown in FIG. 5*a*.

When the motor 112 rotates in the first direction, the needle bearings 512 are positioned in a wide channel end 516 of the respective bearing channels 518. The wide channel end 516 of the bearing channel 518 allows the needle bearing 512 to freely rotate. This means that the needle bearings 512 allow the relative rotation of the second transmission output sleeve 124 with respect to the rotatable release sleeve 508. The frictional force between the rotatable release sleeve 508 and the first transmission output sleeve 122 means that the rotatable release sleeve 508 then rotates together with the first transmission output sleeve 122.

This means that the camming surface 504 of the retaining arm 400 remains in the retaining arm channel 510 as shown in FIG. 5*a* when the motor 112 rotates in the first direction. This means that the camming surface 504 of the retaining arm 400 can move radially outwards into the retaining arm channel 510. Accordingly, the retaining arm 400 is located in the retaining position when the camming surface 504 is located within the retaining arm channel 510 and the ejection mechanism 300 is not engaged.

The retaining arm 400 is shown at a "one o'clock" position in FIG. 5*a*. However, the rotatable release sleeve 508 comprises a plurality of circumferentially spaced retaining arm channels 510. This means that the camming surface 504 is receivable in any of the retaining arm channels 510 depending on the rotational position of the rotatable release sleeve 508.

In FIG. 5*b* the motor 112 is rotating in a second direction. The first transmission output sleeve 122 and the second transmission output sleeve 124 still rotate in opposite directions with respect to each other, but the first transmission output sleeve 122 and the second transmission output sleeve 124 each rotate in an opposite direction compared to when the motor 112 rotates in the first direction. For example, in FIG. 5*b*, the first transmission output sleeve 122 rotates in an anticlockwise direction and the second transmission output sleeve 124 rotates in a clockwise direction.

On reversal of the direction of the motor 112, the needle bearings 512 are caused to travel to the narrow channel end 514 of their respective bearing channels 518. The narrow channel end 514 comprises a channel ramp 520. The channel ramp 520 at the narrow channel end 514 reduces the height in the bearing channel 518 such that the height is smaller than the diameter of the needle bearings 512. This causes the needle bearings 512 to become wedged in the narrow channel end 514 of the bearing channels 518. This means that the needle bearings 512 cannot freely rotate when the motor 112 rotates in the second direction.

Accordingly, the frictional force between the second transmission output sleeve 124 and the rotatable release sleeve 508 is greater than the frictional force between the first transmission output sleeve 122 and the rotatable release sleeve 508. This means that the rotatable release sleeve 508 rotates together with the second transmission output sleeve 124. When the motor 112 rotates in the second direction, the rotatable release sleeve 508 is rotated with respect to the ejector pin 302 and the retaining arm 400.

The engagement ribs 506 of the rotatable release sleeve 508 then rotate with respect to the first transmission output sleeve 122 and the retaining arm 400. The engagement rib 506 adjacent the camming surface 504 of the retaining arm 400 engages the camming surface 504 and forces the retaining arm 400 radially inwards towards the release position as shown in FIG. 5*b* (this movement of the retaining arm 400 is shown by the radial arrow), whereby translational movement of the ejector pin 302 is no longer restricted by the retaining arm 400 so the ejector pin spring 310 can push the ejector pin 302 away from the motor 112 and thus pushes the sheared tip 210 out of the first socket 118. As can be seen from FIG. 5*b*, the rotatable release sleeve 508 has rotated in a clockwise direction with the second transmission output sleeve 124.

During an ejection stage of operation, the controller 126 controls the motor 112 to cause the rotatable release sleeve 508 to turn until the engagement rib 506 adjacent the camming surface 504 of the retaining arm 400 moves completely past the camming surface 504 and the camming surface 504 is aligned with a subsequent retaining arm channel 510 (not necessarily the closest retaining arm channel 510 in the circumferential direction). By stopping rotation of the rotatable release sleeve 508 when the retaining arm 400 is aligned with a retaining arm channel 510 means that the rotatable release sleeve 508 is in the correct position to receive the camming surface 504 when the user engages the tool 100 with another bolt and the tip 210 thereof is received in the first socket 118 which resets the ejection mechanism 300 by pushing the ejection pin 302 back into the retained configuration shown in FIG. 3.

Turning the rotatable release sleeve 508 by an appropriate amount to align a retaining arm channel 510 with the retaining arm 400 at the end of the ejection operation can be achieved by rotating the motor 112 a predetermined extent in the second direction during an ejection operation. The controller 126 can determine the extent to which the motor has turned based on information indicative of motor turn information output by the control electronics of the DC brushless motor 112. The concept of counting motor turns is known and so suitable ways of achieving this functionality will be apparent to persons skilled in the art and will not be discussed here.

The action of moving the first socket 118 into the first transmission output sleeve 122 causes the ejector mechanism 300 to be reset when the tip 210 of a new bolt 200 to be sheared is received in the first socket 118. In order to move the biased retaining arm 400 to the retaining position, the ejector pin 302 comprises a ramped surface 600 which is arranged to engage the lip 602 of the elongate through hole 500. This means the ramped surface 600 pushes against the lip 602 as the ejector pin 302 moves from the extended position to the retracted position.

The pin engagement surface 402 snaps into engagement with the retaining shoulder 404 on the ejector pin 302 when the ejector pin 302 is in the retracted position as shown in FIG. 3 and the camming surface 504 is positioned in the retaining arm channel 510.

Accordingly, the rotatable release sleeve 508 and the arrangement of the needle bearings 512 allows rotational movement with respect to the ejector mechanism 300 in only one direction. This advantageously means that the direction of the motor 112 can be used to selectively actuate the ejector mechanism 300.

The reversal of the motor 112 direction can be manually selected by the user. This means that the user can decide when to eject the tip 210. For example, the user manually pushes a motor direction switch after the tip 210 has been sheared from the bolt body portion 208. The user then squeezes the trigger 106 and the motor 112 rotates in the second direction. This causes the ejector mechanism 300 to be engaged as discussed above and the tip 210 is ejected from the first socket 118.

It will be appreciated that whilst various aspects and examples have heretofore been described the scope of the present invention is not limited thereto and instead extends to encompass all arrangements, and modifications and alterations thereto, which fall within the spirit and scope of the appended claims.

In other examples, the controller 126 of the shear wrench tool 100 issues a control instruction to the motor 112 to reverse the direction. For example, the controller 126 automatically reverses the direction of the motor 112 from the first direction to the second direction when the tip 210 has been sheared from the bolt body portion 208. The controller 126 may determine that the motor 112 is no longer under load in the first direction which indicates that the tip 210 has been sheared. In this case the controller 126 sends a control signal to motor 112 to rotate in the second direction a predetermined extent.

In another example, the controller 126 can automatically reverse the direction of the motor 112 and cause it to rotate a predetermined extent after the user has released the trigger 106. In other examples, the controller 126 can automatically reverse the direction of the motor 112 and cause it to rotate a predetermined extent to engage the ejector mechanism 300 in response to other input from the user. For example, the user can quickly squeeze the trigger 106 twice and the controller 126 reverses the direction of the motor 112 and causes it to rotate a predetermined extent in response to detecting the trigger 106 being actuated twice.

In some examples the shear wrench tool 100 is alternatively powered by mains electricity.

The rotatable release sleeve 508 is mounted between the first transmission output sleeve 122 and the second transmission output sleeve 124 with any suitable bearing. In some examples the needle bearings 512 are replaced with ball bearings.

As mentioned above, the retaining arm 400 is shown at a "one o'clock" position in FIG. 5*a* and the rotatable release sleeve 508 comprises a plurality of circumferentially spaced retaining arm channels 510. However, in other examples the rotatable release sleeve 508 can comprise a single retaining arm channel 510 for receiving the camming surface 504.

The motor 112 rotates in the second direction by a predetermined extent to engage the ejector mechanism 300, wherein this extent is dependent on the nature of the transmission 116 and the configuration of the rotatable release sleeve (such as the width of the channels 510 and the width of the engagement ribs 506). Changes in the overall gear ratio of the transmission 116 and the shape/size of the channels 510 and the engagement ribs 506 changes the extent to which the motor 112 is required to be driven in a reverse direction in order to engage the ejector mechanism 300.

Since there are a plurality of retaining arm channels 510 circumferentially spaced around the rotatable release sleeve 508 in the embodiment shown in the drawings, the motor 112 of such embodiment needs only to rotate a relatively small number of turns in the second direction before the ejector mechanism 300 is engaged. This means that engagement of the ejector mechanism 300 can be quick.

The motor 112 has been described as being a DC brushless motor and the controller 126 cooperates with the brushless motor (in particular with its control electronics) in order to control the brushless motor and determine motor status information e.g. number of motor turns. In other embodiments however the motor 112 may be a brushed motor having a motor output shaft driven by a stator and having at least one magnet on the motor output shaft. For the controller 126 to determine motor turn information of such a brushed motor the tool 100 additionally has a motor sensor (not shown) for generating output indicative of motor turn information; such as a Hall sensor which cooperates with the at least one magnet on the motor output shaft and which generates output indicative of variations in magnetic flux density as the motor shaft rotates which can be used by the controller 126 to determine motor turn information e.g. number of motor turns. Since the concept of counting motor turns in the context of brushed and brushless motors is already known there is freedom for a designer to select a suitable way of determining motor turn information when designing a tool 100 which implements the invention described herein.

In battery operated embodiments of the shear wrench tool 100 the motor 112 (whether brushed or brushless) is configured to operate using DC current whereas in mains operated embodiments the motor is configured to operate using AC current.

What is claimed is:

1. A shear wrench tool comprising:

a motor;

a transmission operatively connected to the motor;

a first socket arranged to engage a tip of a bolt to be sheared;

a second socket arranged to engage a nut threaded on the bolt;

wherein the first socket and second sockets are operatively connected to the transmission and rotate in opposite directions relative to each other when the motor provides torque to the transmission in use;

an ejector mechanism comprising an ejector pin coaxial with the first and second sockets and moveable between a retracted position for enabling the tip of a bolt to be sheared to be received in the first socket and an extended position for urging a sheared tip from within in the first socket, the ejector pin being biased towards the extended position;

wherein the tool is configured such that in use when the motor rotates in a first direction the first and second sockets tighten the bolt and nut without actuating the ejector mechanism whereby the ejector pin is blocked from moving to the extended position and when the motor rotates in a second direction the ejector mechanism is actuated whereby the ejector pin moves to the extended position for removing a sheared tip of the bolt from the first socket.

2. The shear wrench tool of claim 1, further comprising a retaining arm moveable against bias along an axis, which is perpendicular to the axis along which the ejector pin is moveable, between a retaining position in which the retaining arm blocks movement of the ejector pin to the extended position and a release position in which the retaining arm does not block movement of the ejector pin to the extended position.

3. The shear wrench tool of claim 2, wherein the retaining arm defines an opening through which the ejector pin extends.

4. The shear wrench tool of claim 2, further comprising a rotatable release sleeve comprising at least one engagement rib configured to engage a camming surface of the retaining arm for causing axial movement of the retaining arm and actuating the ejector mechanism when the motor rotates in the second direction.

5. The shear wrench tool of claim 4, wherein the rotatable release sleeve comprises a plurality of circumferentially arranged engagement ribs respectively configured to engage the camming surface of the retaining arm depending on the rotational position of the rotatable release sleeve relative to the camming surface.

6. The shear wrench tool of claim 4, wherein in use the motor stops rotating in the second direction during an ejection operation when the motor has rotated in the second direction a threshold number of motor turns.

7. The shear wrench tool of any of claim 4, wherein in use the motor stops rotating in the second direction during an ejection operation when the engagement rib adjacent the camming surface of the retaining arm has moved passed the camming surface and the camming surface is urged into a channel of the rotatable release sleeve.

8. The shear wrench tool of claim 1, further comprising a rotatable release sleeve which rotates relative to the ejector mechanism and actuates the ejector mechanism when the motor rotates in the second direction but remains stationary relative to the ejector mechanism when the motor rotates in the first direction.

9. The shear wrench tool of claim 8, wherein the rotatable release sleeve is mounted between a first rotatable part of the transmission and a second rotatable part of the transmission via a plurality of bearings wherein said rotatable parts of the transmission rotate when the motor provides torque to the transmission in use.

10. The shear wrench tool of claim 9, wherein the rotatable release sleeve cooperates with the first rotatable part of the transmission to define a plurality of bearing channels each containing a respective said bearing and having a wide end and a narrow end, wherein in use when the motor rotates in the first direction the bearings are received in the wide end of the channels whereby the first rotatable part of the transmission rotates relative to the rotatable release sleeve and when the motor rotates in the second direction the bearings are received in the narrow end of the channels whereby the first rotatable part of the transmission causes rotation of the rotatable release sleeve for actuating the ejector mechanism.

11. The shear wrench tool of claim 9, wherein said first part of the transmission is a first transmission output sleeve and said second part of the transmission is a second transmission output sleeve.

12. The shear wrench tool of claim 1, further comprising a feature manipulatable by a user to cause a change in motor direction.

13. The shear wrench tool of claim 1, wherein the motor is caused to start turning and subsequently stop turning in the second direction based on movement of a trigger of the tool by a user.

14. The shear wrench tool of claim 1, further comprising a controller for controlling operation of the motor in at least the second direction.

15. The shear wrench tool of claim 1, wherein the motor is a brushless DC motor.

* * * * *